United States Patent [19]

Morgan

[11] Patent Number: 5,412,896
[45] Date of Patent: May 9, 1995

[54] UTILITY DEVICE FOR A FISHERMAN

[76] Inventor: James G. Morgan, 1950 Bee Creek Rd., Corbin, Ky. 40701

[21] Appl. No.: 53,066

[22] Filed: Apr. 26, 1993

[51] Int. Cl.⁶ .......................... A01K 97/00; B25F 1/02; F21L 15/00
[52] U.S. Cl. ................................ 43/4; 7/106; 7/163; 362/108; 362/253; 359/817; 368/10
[58] Field of Search ............... 43/4, 17.5, 362, 108, 43/253; 7/106, 163, 164, 167, 170; 362/103, 108, 253; 359/815, 817, 802, 803, 808, 809, 810, 442, 795; D22/149; 368/10

[56] References Cited

U.S. PATENT DOCUMENTS

| | | | |
|---|---|---|---|
| D. 291,227 | 8/1987 | Evans | D22/149 |
| 1,884,968 | 10/1932 | Bloch | 359/803 |
| 1,886,747 | 11/1932 | Schroder | 359/817 X |
| 1,909,662 | 5/1933 | Conners | 359/803 |
| 2,355,247 | 8/1944 | Slocum | 362/158 |
| 2,361,414 | 10/1944 | Ramsey | 362/158 |
| 2,622,729 | 12/1952 | Uttz | 7/106 |
| 3,600,064 | 8/1971 | Walz | 359/803 |
| 4,201,090 | 5/1980 | Davidson | 73/431 |
| 4,462,160 | 7/1984 | Cohen et al. | 362/119 |
| 4,540,239 | 9/1985 | Frankel | 359/815 X |
| 4,553,494 | 11/1985 | Constantinescu | 114/66 |
| 4,573,719 | 3/1986 | Aldridge | 289/17 |
| 4,660,314 | 4/1987 | Janssen et al. | 43/4 |
| 4,750,287 | 6/1988 | Myers | 43/17.5 |
| 4,763,986 | 8/1988 | Sego | 359/817 X |
| 4,918,775 | 4/1990 | Leu | 7/168 |
| 4,972,979 | 11/1990 | Gordon | 362/253 X |
| 4,974,130 | 11/1990 | Friedman | 362/199 |
| 5,113,327 | 5/1992 | Levy | 362/253 X |
| 5,251,797 | 10/1993 | Martin | 362/253 X |

FOREIGN PATENT DOCUMENTS 8839 of 1903 United Kingdom ................. 368/10

*Primary Examiner*—P. Austin Bradley
*Assistant Examiner*—Jeanne M. Elpel
*Attorney, Agent, or Firm*—King & Schickli

[57] ABSTRACT

A utility device for a fisherman includes a housing having a neck strap, a downwardly and forwardly directed light source and a magnifying glass for downwardly and forwardly directed viewing in a beam of light generated by the light source. The device also includes a clock facing upwardly toward the user, a measuring tape, a hone, a belt clip, a line cutter and a measuring tape. The housing also includes material providing for flotation. Additionally, the light source, clock, measuring tape, hone and line cutter are all of modular design allowing plug-in mounting in the housing for ease of repair/replacement.

7 Claims, 3 Drawing Sheets

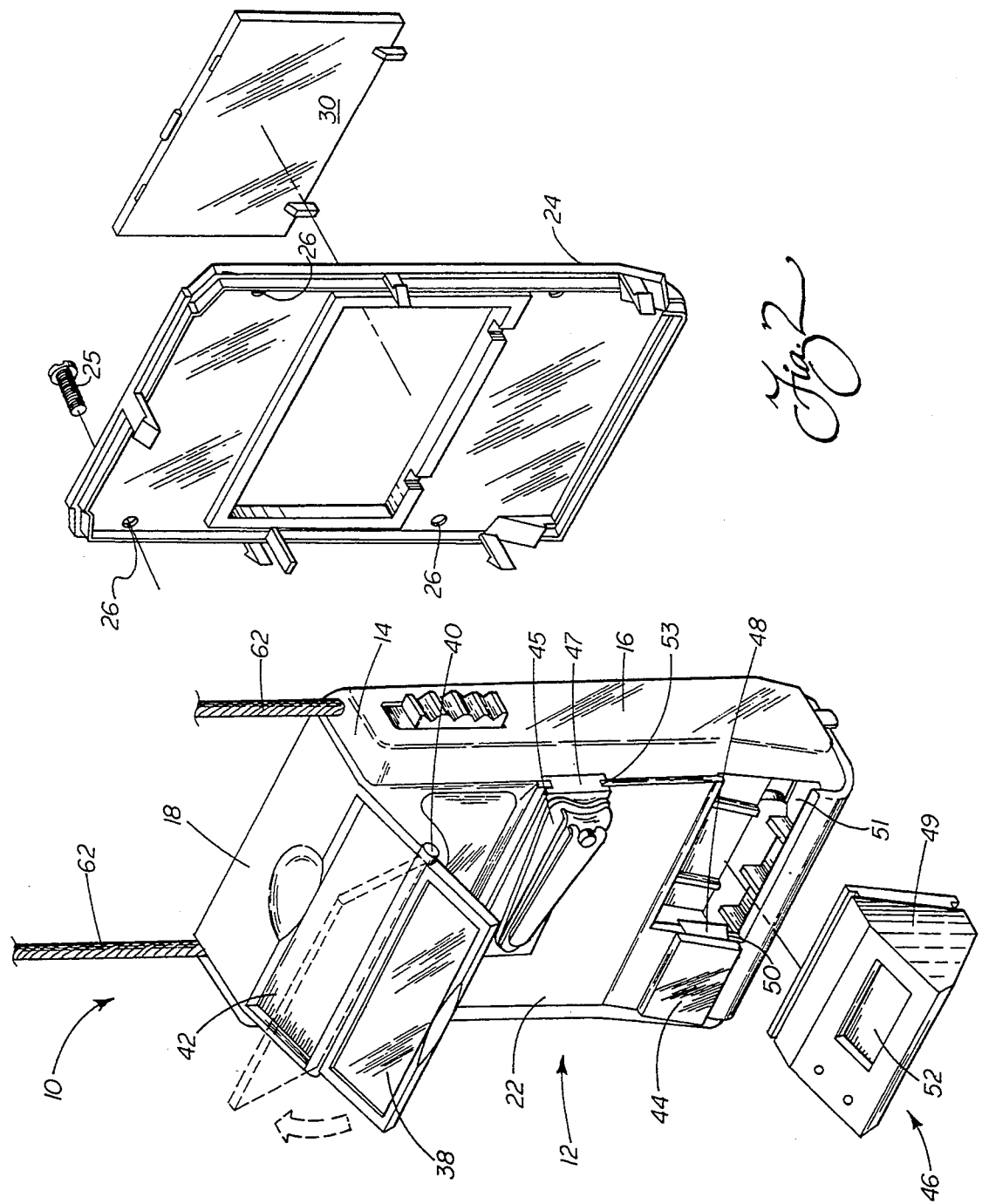

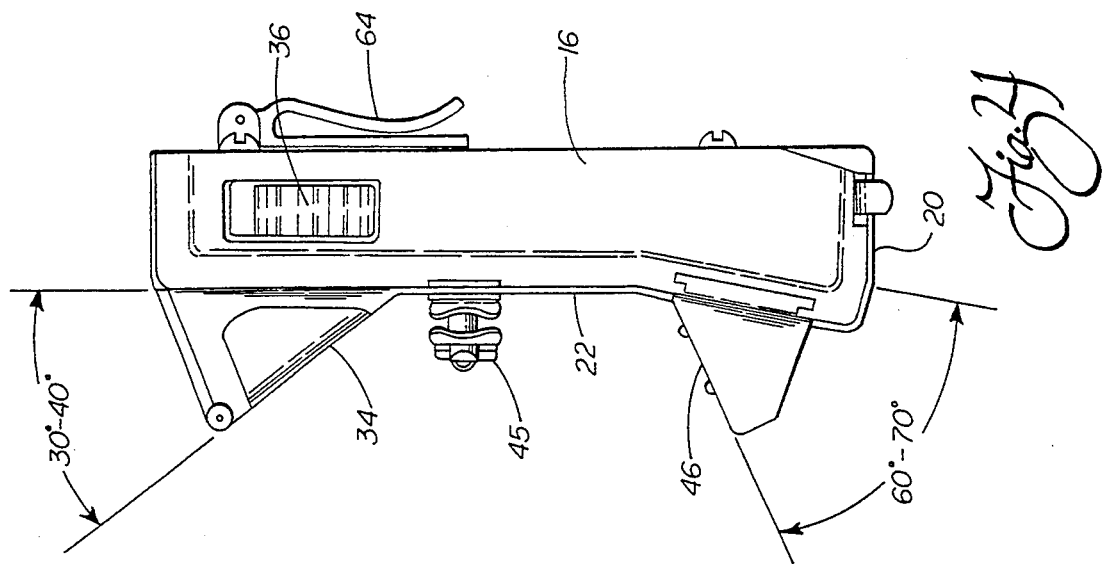
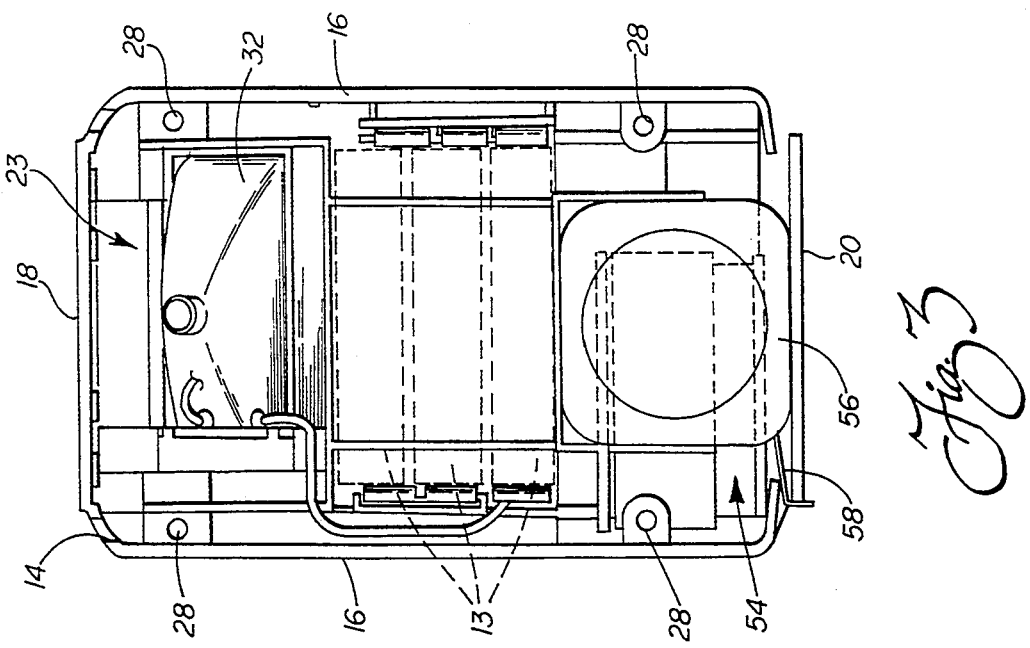

UTILITY DEVICE FOR A FISHERMAN

TECHNICAL FIELD

The present invention relates generally to the sporting field, and, more particularly, to a utility device for fishermen particularly adapted to aide in rigging a line for fishing at day or at night.

BACKGROUND OF THE INVENTION

Fishing is a popular and relaxing outdoor activity enjoyed by a large segment of the population worldwide. Whether fishing in fresh, salt or brackish water and whether using simple bamboo or cane poles or modern metal, graphite, boron or fiberglass rods and reels, "anglers" must string their lines to hook and catch fish.

More specifically, certain fishing equipment, including leaders, sinkers, floats, lures and/or hooks must be attached to the line. The eyelets on, for example, lures and hooks are typically relatively small and it is difficult to thread the line, such as monofilament fishing line, through the eyelet and tie it off. This is particularly true for individuals with less than perfect vision and particularly when fishing in less than ideal lighting conditions and/or from a rocking boat.

In fact, the problem is most apparent during night fishing. Specifically, while a flashlight may be utilized to light the work area and allow visual threading of the line through the eyelet, it must be appreciated that the fisherman requires both hands free to complete the threading and tying operation. Accordingly, a flashlight must typically be rested in a position on the boat. As the boat is often rocking in the water, the light is not steady and, therefore, threading of the line is still difficult.

In view of the foregoing, a need has been identified for a utility device for fisherman particularly adapted to aide in rigging a line for fishing.

SUMMARY OF THE INVENTION

Accordingly, it is a primary object of the present invention to provide a compact and lightweight utility device for utilization by fishermen particularly adapted to aid in rigging a line for fishing.

Another object of the present invention is to provide a utility device for fishermen particularly adapted to hang around the neck of the user and provide enhanced vision as well as hands free operation so as to assist the user in rigging a line or completing other delicate operations (eg. such as extraction of a fish hook from a finger).

Still another object of the present invention is to provide a utility device for fishermen including a variety of different instruments or tools so as to allow convenient utilization and increase the utility/versatility of the device. Advantageously, the tools provided meet the essential requirements of a fisherman and allow, for example, the rigging of lines day or night with a minimum of movement and generation of noise that might frighten the fish from the area.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved utility device is provided to aid a fisherman in rigging a fishing line. The device includes a housing preferably formed of plastic or other lightweight or durable material. A neck strap is connected to the housing and extends upwardly for positioning over the neck of the user. A light source is provided on the housing. Advantageously, the light source includes means for directing a beam of light forwardly of and downwardly from the housing so that when the device is hanging from the neck of the user the light is directed to a work area conveniently accessible to the users hands and field of vision. Additionally, for fine delicate work, a magnifying glass is pivotally connected to the housing. Advantageously, the magnifying glass is selectively positionable for viewing by the user forwardly and downwardly from the housing in the beam of light so as to enhance the vision of the user in the work area accessible to the hands. Advantageously, utilization of the present device allows the user to better see and rig a fishing line when fishing during the day or at night.

More preferably, the device of the present invention is also equipped with other tools/instruments to meet the fisherman's needs and provide for added convenience. Specifically, a clock such as a digital clock may be provided on the housing. Preferably, the clock includes a face directed upwardly and forwardly of the housing at an angle from the front face so as to be presented in the beam of light from the light source and visible at night.

In addition, the device may include a measuring tape mounted on the housing. Specifically, the measuring tape is positioned so as to be readily extendable from the housing to, for example, measure the length of a fish and confirm that the fish falls within fishing limits and therefore may be retained as catch. Preferably, the tape is wound on a spring loaded reel so as to automatically retract into the housing when not in use.

The device may also include a hone for sharpening knifes and a cutter or clippers for cutting fishing line or leaders. Finally, the device may also include a belt clip on the housing to allow clipping to the belt in a convenient location when it is not desired to wear the device over the neck by means of the neck strap. All these additional structures/features add significantly to the usefulness and versatility of the device, making it both easier and more enjoyable to use as well.

In accordance with yet another aspect of the present invention, the device is of modular design. More specifically, the device includes individual units for the light source, clock, measuring tape, hone and line cutter. These units may be mounted by means of cooperating mounting means on the units and the housing so as to allow plug-in connection for ease of repair and replacement.

Further, the device may include means for providing flotation in water. Specifically, a water tight housing construction may be provided. Alternatively, styrofoam or other flotation material may be provided in the housing to achieve this end. In this way, if the device is accidently dropped into the water, it is readily retrievable. Thus, the loss of the equipment and the cluttering of the lake bottom with the lost equipment are both avoided.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is a frontal perspective, partially exploded view of the device of the present invention;

FIG. 3 is a rear elevational view of the device with the rear panel of the housing removed; and FIG. 4 is a side elevational view of the device showing the angular orientation of the light source and clock face relative to the front face panel.

Figure 1:
FIG. 1 is a perspective view of an individual wearing the utility device of the present invention around his neck by means of the neck strap.

Reference will now be made in detail to the present preferred embodiment of the invention, an example of which is illustrated in the accompanying drawing.

DETAILED DESCRIPTION OF THE INVENTION

Reference is now made to the drawing figures showing the utility device 10 of the present invention that is particularly useful to aid in rigging a line for fishing. The device 10 includes a housing 12 molded from ABS plastic or other appropriate material. As best shown in FIG. 2 the housing 12 includes a main body 14 having opposed sidewalls 16, a top end wall 18, bottom end wall 20, and front face panel 22 all of which define a cavity 23. A rear panel 24 closes the cavity 23 in the main body 14. The rear panel 24 may be held in position, for example, by fasteners such as screws 25 received through openings 26 in the rear panel 24 and threadily engaged in openings 28 molded in the main body 14 (see also FIG. 3).

As also shown in FIG. 2, an access door 30 is received in the rear panel 24. As shown with further reference to FIG. 3 this door 30 allows access to the cavity 23 to change batteries B held therein within the main body 14.

The batteries B are utilized to power the light source 32. As best shown in FIGS. 1, 3 and 4, light source 32 is mounted in the cavity 23 of main body 14. Preferably light source 32 includes a reflector for directing the light downwardly and forwardly over the front face panel 22 of the housing 12. Specifically, the light is directed through lens cover 34 with the light source 32 positioned at an angle between 30-40° relative to the front face panel 22. An on/off switch 36 allows selective activation of the light source 32 in a manner known in the art.

A magnifying glass 38 is pivotally connected to the housing 14 by means of a hinge 40. More specifically, the magnifying glass 38 is selectively positionable in a storage position wherein it is received and protected in a recess 42 in the top end wall 18 of the housing. In a second position, the magnifying glass 38 may be pivoted forwardly to allow downward viewing of the area being lighted by the light source 32 (note full line position shown in FIG. 2).

In accordance with still another aspect of the present invention, a hone 44, line clippers 45 and a clock 46 may be mounted in the main body 14. More specifically, hone 44 includes a substantially T-shaped mounting bracket 48 that is slidably received in and engages a slot 50 in the front face panel 22 of the main body 14 (see FIG. 2).

The line clippers 45 are mounted to a block 47 that engages in a slot 53 in the same manner as the mounting bracket 48 just described and shown in FIG. 2.

The clock 46 is also a modular unit including a housing 49 that plugs in for a friction fit in opening 51 of the front face panel 22. When properly mounted as shown in FIGS. 1 and 4, the face 52 of the clock is angled upwardly and forwardly from the front face panel 22 between 60-70° from the horizontal. In this way, the face 52 is lighted by the light source 32 during night time use.

As further shown in FIG. 3, the main body 14 also houses in the cavity 23 a measuring tape 54 of a type known in the art including a housing 56 for a spring loaded reel (not shown) and a retractable tape line 58. As shown, the line 58 includes a tab 60 at the distal end that may be grasped with the fingers to extend the line 58 for measuring as required. Once measuring is completed, the line 58 is conveniently retracted from view.

The device 10 of the present invention is particularly convenient to utilize. More specifically, as shown in FIG. 1, a neck strap 62 is attached to the housing so as to extend upwardly from the top end wall 18. When the strap is positioned over the head of the user, the light source 32 directs light downwardly and forwardly from the housing 12 into a work area within the user's direct field of vision and readily accessible to the user's hands. Of course, as a result of operation of the neck strap 62, both hands remain free for the rigging of a fishing line or other operation. Further, if detailed work is being completed, the magnifying glass 38 may be pivoted forward as shown by action arrow A in FIG. 2. The user may then conveniently look through the magnifying glass 38 into the lighted work area and complete the delicate operation of, for example, threading a line through the eyelet of a hook.

For further convenience, a belt clip 64 of a type known in the art may be attached to the rear panel 24 of the housing 12. Thus, when the neck strap 62 is not in use the device 10 may be conveniently clipped to the belt where it is readily accessible to the user. In this way the device 10 is less likely to be inadvertently misplaced and, therefore, more likely to be available for use when needed.

In summary, numerous benefits result from employing the concepts of the present invention. The device 10 is lightweight and compact and therefore may be worn around the neck without causing discomfort or fatigue. Further, because of the unique orientational layout of the neck strap 62, light source 32 and magnifying glass 38, the users hands remain free to complete delicate operations in a well lighted work area. The magnifying glass 38 provides for enhanced visibility through magnification of the work subject. Further, the other convenience features of the device increase its versatility and benefit to the fisherman. Additionally, the modular construction allows for the utmost convenience is repairing/replacing component parts.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A utility device for a fisherman user particularly adapted to aid in rigging a line for fishing, comprising:
   a housing:
   a neck strap connected to and extending upwardly from said housing for positioning over the head and around the neck of the user;
   a light source on said housing including means for directing a beam of light forwardly of and downwardly from said housing;
   a magnifying lens connected to said housing and selectively positionable for viewing by the user forwardly and downwardly from said housing into said beam of light whereby said user is allowed to better see to rig a fishing line at night; and
   means in said housing for providing flotation in water;
   said utility device being further characterized by including a clock on said housing, said light source being directed downwardly and forwardly from a front face of said housing at an angle of between substantially 30°–40° and said clock having a face directed upwardly and forwardly on said housing at an angle from said front face between substantially 60°–70° so as to be presented in said beam of light from said light source.

2. The device set forth in claim 1, further including a measuring tape on said housing.

3. The device set forth in claim 1, further including a hone on said housing for sharpening knives.

4. The device set forth in claim 1, further including a belt clip on said housing.

5. The device set forth in claim 1, further including a line cutting means on said housing.

6. The device set forth in claim 1, further including a measuring tape, a hone, a belt clip and a line cutting means on said housing.

7. The device set forth in claim 6, wherein said device is of modular design including (a) individual units for said light source, clock, measuring tape, hone and line cutting means and (b) cooperating mounting means on said units and said housing allowing plug-in mounting for ease of repair/replacement.

* * * * *